United States Patent [19]
Reynolds et al.

[11] Patent Number: 6,040,384
[45] Date of Patent: Mar. 21, 2000

[54] CABLE ASSEMBLIES

[75] Inventors: Kim A. Reynolds, Berwyn; Charles P. Marino, Philadelphia; Kevin P. Kray, Phoenixville, all of Pa.

[73] Assignee: Markel Corporation, Norristown, Pa.

[21] Appl. No.: 08/843,928

[22] Filed: Apr. 17, 1997

Related U.S. Application Data

[63] Continuation-in-part of application No. 08/472,514, Jun. 7, 1995, which is a continuation-in-part of application No. 07/263,182, Oct. 27, 1988.
[60] Provisional application No. 60/015,543, Apr. 17, 1996.

[51] Int. Cl.[7] ............................................. C08F 8/30
[52] U.S. Cl. .......................... 525/180; 525/178; 525/180
[58] Field of Search .................................. 525/178, 180, 525/540; 524/800, 462, 546; 428/35.7; 264/127; 248/49, 55

[56] References Cited

U.S. PATENT DOCUMENTS

| | | | |
|---|---|---|---|
| 3,356,759 | 12/1967 | Gerow | 260/857 |
| 3,391,221 | 7/1968 | Gore et al. | 260/857 |
| 3,409,584 | 11/1968 | Buschman et al. | 260/41 |
| 3,477,474 | 11/1969 | Mesler | 138/133 |
| 3,528,312 | 9/1970 | Nielsen | 74/501 |
| 3,819,594 | 6/1974 | Holmes et al. | 260/87.5 A |
| 3,930,419 | 1/1976 | Kramer | 74/501 P |
| 3,990,321 | 11/1976 | Hurlow | 74/501 R |
| 4,077,277 | 3/1978 | Henning | 74/501 P |
| 4,112,708 | 9/1978 | Fukuda | 64/2 R |
| 4,143,204 | 3/1979 | Fang | 428/413 |
| 4,280,338 | 7/1981 | Shannon et al. | 64/2 R |
| 4,300,408 | 11/1981 | Yoshifuji | 74/501 R |
| 4,362,069 | 12/1982 | Giatras et al. | 74/501 P |
| 4,451,616 | 5/1984 | Kawachi et al. | 525/178 |
| 4,451,983 | 6/1984 | Johnson et al. | 30/276 |
| 4,480,494 | 11/1984 | Gilmore | 74/473 SW |
| 5,161,427 | 11/1992 | Fukuda et al. | 74/502.4 |

*Primary Examiner*—Samuel A. Acquah
*Attorney, Agent, or Firm*—Synnestvedt & Lechner LLP

[57] ABSTRACT

This invention relates generally to cable assemblies, and more particularly to flexible cable assemblies of the type used in automobiles for transmitting rotary or linear motion along a predetermined path. In a particular aspect, the present invention relates to abrasion-resistant fluorocarbon polymer composites, such as polytetrafluoroethylene ("PTFE") composites, having an unexpectedly high frictional efficiency under high load conditions and after long cycle times. The present invention relates to abrasion-resistant, anti-friction tubing formed from such composites, and to uses of such tubing as a liner for flexible, motion transmitting cable assemblies.

1 Claim, 2 Drawing Sheets

CABLE ASSEMBLIES

CROSS-REFERENCE TO RELATED APPLICATIONS

This is based on provisional U.S. Application No. 60/015,543, filed Apr. 17, 1996, and is a continuation-in-part of U.S. application Ser. No. 08/472,514, filed Jun. 07, 1995, pending, which is a continuation-in-part of U.S. application Ser. No. 07/263,182, filed Oct. 27, 1988, pending.

This invention relates generally to cable assemblies, and more particularly to flexible cable assemblies of the type used in automobiles for transmitting rotary or linear motion along a predetermined path. In a particular aspect, the present invention relates to abrasion-resistant fluorocarbon polymer composites, such as polytetrafluoroethylene ("PTFE") composites, having an unexpectedly high frictional efficiency under high load conditions and after long cycle times. The present invention relates to abrasion-resistant, anti-friction tubing formed from such composites, and to uses of such tubing as a liner for flexible, motion transmitting cable assemblies.

Motion and/or power transmitting cable assemblies are used in a large number of important commercial applications. Perhaps the most common use of such devices occurs in automotive, marine and aircraft installations. Although such cable assemblies are generally hidden from the view of the user, they nevertheless play an important role in many of these well-known modes of transportation. For example, many automobile accessories, such as heaters, air conditioners and side-view mirrors, are dependent upon such assemblies for convenient and reliable operation. Motion transmitting cable assemblies are also frequently indispensable components in the mechanisms used to control critical aspects of vehicle operation. For example, throttle and clutch cables are frequently used to control the speed and power of a vehicle, respectively. It will be appreciated, therefore, that reliable operation of such devices over long periods of use is critical to the safety of present day automobiles.

Furthermore, such assemblies are often exposed to high temperature environments and must be capable of transmitting the required actuating force over relatively long and serpentine paths, with minimal frictional drag; excessive frictional drag may cause extremely dangerous conditions, such as a non-responsive throttle control. In many cases the required actuating force is relatively high, as is the case in connection with clutch and transmission cable assemblies. Accordingly, the provision of cable assemblies which satisfy the above-noted objectives has long been a need in the automobile industry.

Generally, motion transmitting cable systems in common use today comprise a conduit and a motion transmitting core element movably disposed in the conduit. The conduit typically has fittings at each end thereof for attaching the cable assembly to a support structure. In one type of assembly, commonly referred to as a push-pull cable assembly, the cable core is both pushed and pulled to effect remote control of some servient mechanism, apparatus or device. When push-pull cable assemblies are operated in the push mode, the cable core is placed under a compressive load and a substantial lateral load is transmitted to the wall of the associated sheath or conduit. As a result, the side walls of the cable conduit or sheath are frequently subject to intermittent and potentially severe loading, depending upon the mode of operation. Another type of cable assembly is commonly referred to as a "pull-pull" cable assembly. In such assemblies, the core element is substantially always operated in tension, never in compression. While such assemblies do produce wear of the cable conduit and its liner, the wear is generally not as severe as with the push-pull type assemblies. In rotary type assemblies, the cable core is rotated in predetermined relation to an operating parameter, such as the speed of a motor vehicle. In such configurations, the conduit is also subject to abrasion as a result of contact with the rotating core.

Fluorocarbon polymers, such as PTFE resins, are well known in the art and have heretofore been utilized in extruded tubular products. Although PTFE resins in their pure form exhibit excellent frictional efficiencies, they generally have unacceptably low abrasion resistance, that is, they wear too rapidly.

The wear resistance of PTFE extruded tubular products has traditionally been enhanced by the inclusion of inert, inorganic fillers such as glass fibers, carbon, asbestos fibers, mica, metals and metal oxides. See, for example, U.S. Pat. No. 3,409,584. While a measure of improvement in wear resistance has thus been achieved, PTFE composites comprising inorganic fillers nevertheless have several disadvantages. For example, such composites generally exhibit rapid deterioration in frictional efficiency after relatively short periods of use. Moreover, the use of such composites as liners for externally lubricated push pull cable assemblies is not generally recommended because the inorganic fillers have been found to separate from the composite and form an abrasive slurry with the lubricant. This abrasive slurry not only decreases frictional efficiency, but it can also cause catastrophic and rapid failure of the liner. As a practical result, therefore, it has previously not been possible to successfully use inorganically filled PTFE composites in lubricated push-pull cable assemblies.

U.S. Pat. No. 4,451,616, issued to Kawachi et al., discloses a process for the preparation of a composite comprising PTFE and an organic filler. Kawachi et al. teach that the both organic and inorganic fillers can be used. More specifically, the filler of Kawachi can be selected from the group consisting of polyimide resins, polyamide-imide resins, polyamide resins and carbon fiber powders. The Kawachi process involves coagulation of PTFE and one of the above mentioned fillers from an aqueous dispersion of these two components. The weight proportion of PTFE and the filler in their aqueous dispersion is disclosed as being from 100:5 to 100:80. Although the patent discloses that the abrasion resistance of PTFE can be enhanced by the incorporation of the above mentioned fillers, there is no indication that any one of those fillers is preferred over another, or that a particular concentration of filler in the composite is preferred.

U.S. Pat. No. 3,391,221, issued to Gore et al., discloses fluorocarbon polymer molding compositions containing from about 10 to about 55 volume percent of what are called "permanent lubricant modifiers" selected from the class consisting of (a) nonvolatile liquids which remain thermally stable and liquid at the sintering temperatures of the fluorocarbon polymer, and have low vapor pressures at those temperatures and (b) materials which are liquid during the forming of the fluorocarbon polymer article and are transformed into a solid in the final shaped article. One important function of the lubricant modifiers of Gore is to act as a lubricating agent during shaping of the polymer. A variety of materials are disclosed as lubricant modifiers, including: aromatic polyamides formed by the reaction of aromatic dicarboxylic acids such as terephthalic acid with aromatic amines such as phenyl diamine or biphenyl diamine; the aromatic polyimides formed by the reaction of such acid dianhydrides as pyromellitic dianhydride with the stated aromatic diamine; the polyamide, polyimide copolymers from the above named components; aromatic polyesters formed from the aromatic dicarboxylic acid and aromatic diols; polybenzimidazoles formed from the aromatic tetracarboxylic acids such as pyromellitic acid and aromatic tetramines; aromatic polyethers; and Novolac epoxy, resins. The only guidance that the patent provides with respect to the selection of modifiers for the enhancement of frictional efficiency is that phenyl silicone lubricants are said to provide high lubricity under high unit loads, and that polymerizable monomers and prepolymers that are polymerized in situ provide molded articles that have a low coefficient of friction. The patent provides no indication that any particular concentration of filler is preferred over another.

U.S. Pat. No. 3,356,759, issued to Gerow, discloses compositions of aromatic polypyromellitimides and a polyfluorocarbon resin. Although this patent broadly refers to the presence of from about 10 to about 90% by weight of fluorocarbon resin in the composite, it expressly teaches that the composite preferably have no more than 50% by weight of the fluorocarbon resin. Accordingly, the Gerow reference teaches composites in which the polyfluorocarbon components preferably constitute a minor proportion of the composite.

Composites comprising a mixture of PTFE and polyarylene sulfide have heretofore been used in fabricating flexible liner or tubing for push-pull cable assemblies. For example, U.S. Pat. No. 4,362,069, issued to Giatras and assigned to the assignee of the present invention, describes a fluorocarbon composite fabricated from a mixture of PTFE resin and a polymer of arylene sulfide. The composite described in this patent, which has exceptional anti-friction, anti-abrasion characteristics, has long been considered one of the preferred products for use in push-pull cable liners. However, despite the success of such products, there is still a need for a liner material which exhibits exceptional anti-friction, anti-abrasion characteristics for a high number of cycles under high load conditions.

SUMMARY OF THE INVENTION

One aspect of the present invention provides low cost cable assemblies having reliable and relatively low friction cable operation over long periods of high load use. Applicants have discovered that this and other desirable characteristics are produced by cable assemblies comprising an elongated core for transmitting force or torque along a predetermined path and guide means comprising a liner according to the composition aspects of the present invention.

The abrasion resistant, high efficiency compositions of the present invention comprise a major proportion by weight of fluorocarbon polymer resin, and less than about 10% by weight of polyimide resin filler, preferably having an average particle size of about 20 micron or less. The polyimide resin is preferably a thermoplastic polyimide. Applicants have discovered that unexpectedly superior results are achievable when such a filler is utilized. More particularly, applicants have found that the use of thermoset polyimide resin does not produce performance properties in terms of high load frictional efficiencies that are obtainable in accordance with certain preferred embodiments of the present invention. Furthermore, applicants have discovered the abrasion resistance and frictional efficiency of the present composites is not achievable over long cycle times and with high loads unless the amount of the polyimide included in the composite is as required herein.

According to preferred embodiments of the apparatus aspects of the present invention, the guide means includes a bearing surface comprising a polymer composite of the present invention for resisting abrasion of the guide means as said core moves along the predetermined path. Applicants have found that cable assemblies employing such liners provide results which are not only unexpected in view of the prior art, but which also differ in kind from the results produced by cable assemblies using other liners. According to a preferred aspect of the invention, the polymeric composite liners used in the present cable assemblies have an abrasion resistance of at least about 750,000 cycles of the ambient high load S-test, and even more preferably exhibit a frictional efficiency of at least about 90% over 1,000,000 cycles of the ambient high load S-test.

DETAILED DESCRIPTION OF PREFERRED EMBODIMENTS

Figure 1:
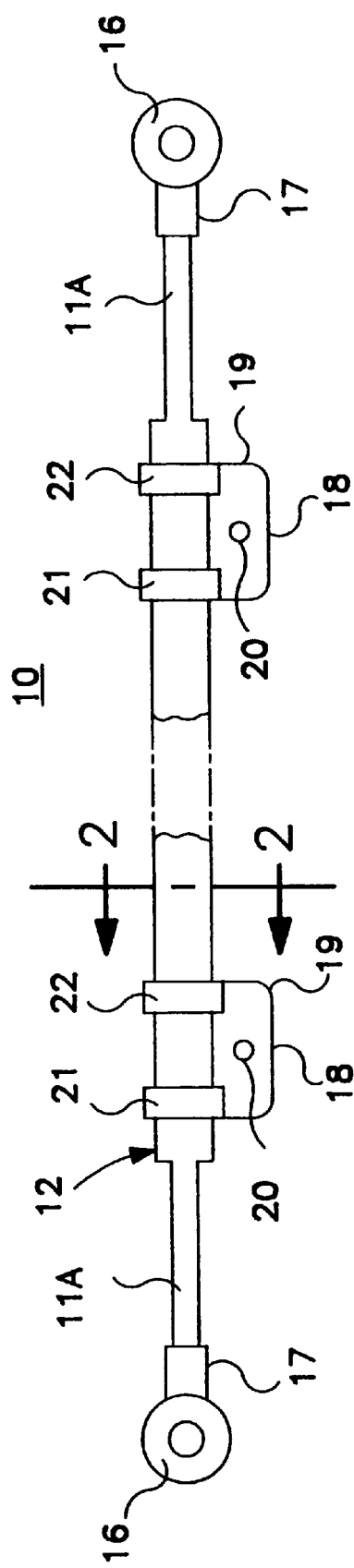
FIG. 1 is a semi-schematic representation of a cable assembly configuration according to one embodiment of the present invention.

The present invention provides cable assemblies adapted to transmit motion along a predetermined path between two remotely located points. The assemblies generally include a torque or force transmitting core member adapted to carry the torque or force along the predetermined path. The principal requirement of the core member is that it is of sufficient strength and durability to reliably withstand the various stresses and loads associated with the transmission of the force or torque. Many such motion-transmitting core members are well known in the art, and all are adaptable for use according to the present invention. According to preferred embodiments, the core is a stranded steel wire or rope having a generally circular cross-section and a diameter of from about 50 mils to about 150 mils.

The present cable assemblies also comprise guide means for guiding the movement of the core member along the predetermined path. In order to obtain operative movement between the core and guide means, the cable assemblies of the present invention commonly require that a gap or clearance exist between the surface of the core and the guide means. It will be understood by those skilled in the art that the amount of gap or clearance which is provided by any particular cable assembly configuration is a function of numerous variables, including the contemplated routing for the assembly, the type of motion the assembly will be used to transmit, and the extent of the load to be transmitted. Accordingly, all such gaps and clearances which permit the repetitive relative movement between the core and the guide means under the conditions of expected use are within the scope of the present invention.

According to an important and critical aspect of the present apparatus, the guide means preferably includes a bearing member having a low friction surface against which said core member bears as it transmits the force or torque along said predetermined path, said low friction surface being comprised of the fluoropolymer and polyimide composite of the present invention.

The abrasion resistant, high efficiency compositions of the present invention comprise a major proportion by weight of a resin of fluorocarbon polymer, and less than about 10% by weight of polyimide resin filler. The present compositions may optionally include inorganic fillers, lubricants, pigments and other modificants as will be appreciated by those skilled in the art. According to preferred embodiments, the composites of the present invention consist essentially of from about 77% to about 98% by weight of fluorocarbon polymer and from about 2% to less than about 10% by weight of polyimide resin. As the term is used herein, fluorocarbon polymer refers to and is intended to include not only a single fluorocarbon polymer entity but also a mixture of any two or more fluorocarbon polymer entities. Likewise, the term "polyimide resin," is intended to include not only a single polyimide resin but any mixture of two or more distinct polyimide resin entities.

Fluorocarbon polymer suitable for use according to the present invention include a wide variety of fluorocarbon polymers but preferably comprise polytetrafluoroethylene ("PTFE"). PTFE polymers useful in the practice of the present invention preferably comprise a major proportion of PTFE homopolymer, although it is contemplated that copolymers of tetrafluoroethylene with other fluorocarbon monomers may also be used according to some embodiments. According to preferred embodiments, the fluorocarbon polymer of the present invention comprises a PTFE homopolymer formed by the copolymerization of PTFE monomer and from about 0% to about 2% by weight of chlorotrifluoroethylene monomer. Such a preferred fluoropolymer is available from Diaken Corporation under the trade designation F201. It will be appreciated by those skilled in the art that minor amounts of other comonomers, such as hexafluoropropylene or chlorofluorovinylether may be used in place of or in addition to the chlorotrifluoroethylene comonomer in the preferred fluorocarbon polymer. The PTFE polymer suitable for use in the composites of the present invention include conventional PTFE polymers obtained by conventional means, for example, by the polymerization of tetrafluoroethylene under pressure using free radical catalysts such as peroxides or persulfates.

According to especially preferred aspects of the present invention, the PTFE polymer resins are paste extrudable polymer resins. Such resins are generally in the form of extrusion grade powders, fine powders, and the like. The preferable PTFE powders are dispersion grade and not granular. Techniques for the production of fine PTFE powders are well known, and the use of polymers produced by any of these techniques is well within the scope of this invention. For example, fine PTFE powder may be produced by coagulating colloidal PTFE particles as disclosed in U.S. Pat. No. 4,451,616, which is incorporated herein by reference.

The polyimide resins of the present invention are polymers which incorporate the imide group, —CONCO—, in the polymer main chain. The use of thermoplastic polyimide is preferred, with aromatic thermoplastic polyimide being most preferred.

Techniques for fabricating such polyimides are well known and readily available to those skilled in the art. For example, aromatic thermoplastic polyimides can be generally produced by the poly condensation reaction of aromatic dianhydride with either aromatic diamine or aromatic diisocyanate in a suitable reaction medium. Such aromatic thermoplastic polyimides have a general structure depicted below:

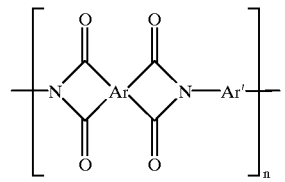

Polyimide resins of the type suitable for use in the practice of the present invention are preferably aromatic, thermoplastic polyimide resins such as those available commercially from Mitsui Toatsu Chemicals America, Inc. and sold under the trade designation "AURUM." Although most grades of polyimide resins are generally adaptable for use in the present compositions, AURUM resins having the grade designation "450" are preferred. AURUM-450 is an aromatic thermoplastic polyimide resin having a mean particle size of about 20 to about 50 microns.

Polyimide resins are available in a wide variety of particle sizes, and resins having all such particle sizes are believed to be readily adaptable for use according to the present invention. Applicants have found, however, that the particle size of the polyimide resin used in the present composites has an impact on the properties of the shaped article produced from the composite. For example, when the composites are processed as hereinafter described to produce extruded tubular products, the polyimide powders having mean particle sizes of up to about 50 microns are typically preferred. Applicants have found that powders having average particle sizes in excess of about 50 microns tend to result in extruded products that have relatively low frictional efficiency and abrasion resistance. Moreover, the smaller particle sizes tend to facilitate the paste extrusion process.

In accordance with the present invention, the polyimide resins are blended with the PTFE resin in amounts sufficient to attain a composite that is at once readily extrudable by paste extrusion, has a relatively high frictional efficiency and exhibits excellent abrasion resistance over extended periods of use and under high load conditions. It has been discovered that polyimide resins are preferably present in amounts of from about 2% to less than 10% by weight of the composite. Composites formulated within this range contain sufficient polyimide resin to ensure that abrasion resistance and high frictional efficiency are imparted to the composite even when exposed to high load conditions. Applicants have found that the use of 3% to less than about 10% is especially preferred. This preferred range is critical according to certain preferred aspects of the invention. More particularly, applicants have found that the use of polyimide resin in an amount of about 10% or greater results in premature failure of liners exposed to high load conditions as identified hereinafter. Furthermore, it has been discovered that the use of as little as 3% by weight of polyimide resin produces the beneficial results described above and hereinafter.

The composites of the present invention may optionally include further additives such as lubricating fluids, inorganic fillers, pigments and other modificants generally known to those skilled in the art. Useful inorganic fillers include glass, metal and metal oxide components. These and other inorganic fillers can generally be employed in the form of beads, fibers, powders, liquids and the like as is well understood by those skilled in the art. Inorganic fillers may be incorporated in amounts sufficient to impart the desired in tensile strength as is well understood by those skilled in art.

Methods for formulating polymer composites are well known to those skilled in the art and may be used in formulation of the composites of the present invention. One preferred method for formulating such composites comprises mixing PTFE powder resin, and preferably fine PTFE powder resin, with a polyimide powder resin. Any well known mixing process that achieves homogeneous and uniform mixing may be employed, although mixing by tumbling in a suitable commercial blender such as a Patterson Kelly Twin Shell at temperatures up to about 68° F. for a period of about 3 minutes is generally preferred. In formulating, it has been found that the PTFE and the polyimide resins are preferably in powder form and have an average particle size estimated to be from about 2 to about 50 microns.

It is contemplated that the fluorocarbon based polymeric composites of the present invention may be processed using various fabricating methods, including extrusion, to produce abrasion resistant shaped articles having high frictional efficiencies in the dry state. Although it is contemplated that the present composites may be processed by any one of various well known techniques, the present composites are particularly well adapted for processing by paste extrusion to fabricate tubes, rods, wire coatings, liners and the like. In the paste extrusion process, the fluorocarbon based polymeric composite is compressed into a cylindrical preform by techniques well known in the art. An extrusion aid, typically a volatile lubricant such as naphtha or other volatile paraffinic hydrocarbon, is optionally added to the preformed composite in an amount from about 10% to about 25% by weight. The preformed composite is then shaped into the desired form by cold flow extrusion. After extrusion, the extrusion aid is substantially removed from the shaped article. According to one embodiment, removal of the extrusion aid comprises heating the shaped composite for time and at a temperature sufficient to effect removal of the extrusion aid, typically for about 15 seconds at about 350° F. The shaping process further preferably comprises a sintering step in which the extruded composite is heated for time and at a temperature sufficient to fuse or sinter the compressed powders into a homogeneous product, typically for about 20 seconds at about a temperature of at least about 647° F. (342° C.). The shaping process may be, and preferably is, carried out continuously.

The shaped articles of the present invention may be further treated after extrusion by post-curing at temperatures of from about 500° F. to about 900° F. for time periods from about 5 minutes to about 24 hours, and preferably at from about 500° F. to about 527° F. for at least about 16 hours.

The shaped articles prepared according to the present invention are abrasion resistant extruded products having superior frictional efficiency and wear resistance under high load conditions. Unlike composites which contain other fillers and in differing amounts, it has been found that the increased wear resistance is achieved with the composites of the present invention without an attendant decrease in frictional efficiency but with an increase in the useful life thereof.

One important aspect of the present invention relates to the wall thickness of the present tubular liners. Motion transmitting cable assemblies are frequently used in applications requiring high flexibility and low weight. Accordingly, it is preferred that the tubular liners of the present invention be thin walled tubular liners having a wall thickness of less than about 0.05 inch, and even more preferably less than about 0.02 inch. Such thin walled tubular liners provide a relatively thin wear layer, and as such it is especially critical that these liners posses the exceptional abrasion resistance and frictional characteristics of the composite products of the present invention.

The present invention will now be described below in connection with a cable assembly adapted for transmitting motion in a longitudinal direction. It will be appreciated by those skilled in the art, of course, that such embodiments are illustrative only and are not limiting of the present invention. For example, cable assemblies according to the present invention are readily adaptable for transmitting rotary motion along a predetermined path.

Figure 2:
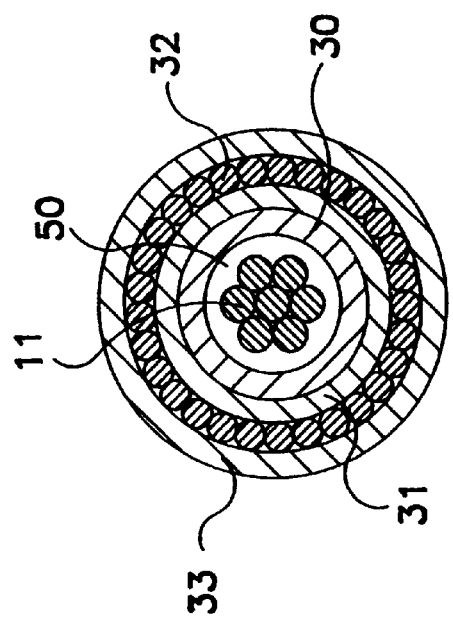
FIG. 2 is a cross-sectional view taken along lines 2—2 of the cable assembly configuration shown in FIG. 1.

Referring now to FIGS. 1 and 2, a typical push-pull or pull-pull cable assembly configuration is illustrated. The cable assembly, indicated generally at 10, comprises a motion transmitting core 11 surrounded by guide means in the form of a casing or conduit, indicated generally at 12, for guiding the motion of core 11 along its predetermined path. According to the embodiment shown in FIG. 2, core 11 may consist of a braided strand of wire cable of the type shown in U.S. Pat. No. 4,362,069. Other configurations of core 11 are possible and within the scope of the present invention.

With particular reference now to FIG. 1, the core 11 is seen as including an end portion 11A which projects lengthwise beyond the end of the casing 12. The length of the projecting end portion 11A of core 11 depends upon the lengthwise sliding movement of the core with respect to casing 12. In typical configurations, the cable assembly 10 is adapted to operatively connect an actuating device, such as an accelerator pedal (not shown), and an operable mechanism, such as an automobile carburetor control mechanism (also not shown). Means in the form of a pair of eyelet members, designated generally as 16, are provided on the ends 11A of the core 11 for operatively connecting the cable assembly 10 between the actuator and its associated device. Each of the eyelets 16 comprises a generally ring-shaped connecting section and a hollow, sleeve-like mounting section 17 adapted to receive the ends of the core 11A and be secured thereto by crimping or the like. The casing 12 is provided with means for fixedly securing the cable assembly 10 in a predetermined operative position. According to the embodiment shown in FIG. 1, such means is provided by a suitable support bracket 18 comprising a generally flat mounting section 19 having an opening 20 adapted to receive a suitable mounting bolt or the like (not shown). Integrally connected to one edge of the bracket 19 is a pair of tab-like elements 21 and 22 secured to outer casing 12.

The configuration of conduit 12 will now be described in more detail in connection with FIG. 2. The conduit 12 is a multi-layered tubular conduit comprising the present polymer composite liner 30 immediately surrounding core 11. As clearly illustrated in FIG. 2, a gap or clearance 50 exists between liner 30 and the enclosed core 11. As mentioned hereinbefore, the particular gap employed in any cable assembly configuration will vary widely, depending upon numerous factors and constraints not related to the present invention. For cable assemblies of the general type illustrated in FIGS. 1 and 2, however, it is generally preferred that the gap or clearance will be from about 0.5 mil to about 20 mil, with a gap from about 3 mil to about 15 mil being even more preferred. It will be appreciated by those skilled in the art that the gap 50 will not necessarily be a constant and uniform spacing along the entire length of the cable assembly, especially cable assemblies used in serpentine routings. Accordingly, the term "gap" is generally used herein to define the distance between the outer surface of the core and the inner surface of the guide means based upon the relative dimensions of those elements.

An inner wrap 31 surrounds the liner 30. Inner wrap 31 may comprise a closed wrapping of flat wire or a plastic tubular sheath surrounding liner 30. As is known to those skilled in the art, a primary purpose of the inner wrap 31 is to aid in maintenance and control of the shape and dimension of liner 30. According to the embodiment shown in FIG. 2, a full compliment of lay wire 32 surrounds inner wrap 31. As will be appreciated by those skilled in the art, the use of a full compliment of lay wire provides added resistance to axial compressive load deflection. Of course, the lay wire may be spaced or even omitted when such axial load deflection resistance is not an important requirement, such as may be the case in certain pull-pull type cable assemblies. In certain other embodiments, an outer wrap of flat wire or other material (not shown) may encircle the lay wire, as is understood by those skilled in the art. An outer jacket 33 encases the lay wire 32. The outer jacket 33 preferably comprises a material which provides water leak resistance to the cable conduit, such as polypropylene.

As will be appreciated by those skilled in the art, conduit 12 provides means for guiding the movement of core member 11 along the selected predetermined path. The polymer composite liner 30 provides the conduit 12 with a low friction bearing surface against which said core member bears as it moves along its predetermined path. As mentioned above and explained more fully hereinafter, the formation of conduit 30 from the present polymeric material provides an abrasion-resistant, low-friction surface which allows efficient and reliable operation of the cable assembly 10. While the motion transmitting core member 11 is generally movably contained within tubular liner 30, it is possible that alternative configurations may be employed. For example, the combination of core 11 and liner 30 may be modified such that the liner is fixedly mounted to the core. In such embodiments, the liner 30 acts as a protective covering for the core which moves as the core moves along the predetermined path. That is, the liner 30 constitutes an element of the guide means which provides a polymer composite bearing surface for resisting abrasion of the guide means as said core moves along the predetermined path.

According to the preferred configuration shown in FIG. 2, the liner 30 is provided in a generally circular cross-section. It will be appreciated by those skilled in the art, however, that other configurations of the liner are available and within the scope of the present invention. For example, the liner 30 may comprise a tubular member having a plurality of convolutions which facilitate bending and longitudinal compression thereof, as disclosed in U.S. Pat. No. 3,930,419. Furthermore, cable assemblies of the type disclosed in U.S. Pat. No. 4,112,708 have tubular liners formed with numerous cross-sectional configurations. All such variations are within the scope of the present invention.

The following examples, set forth by way of illustration but not limitation, depict the improved and unexpected results achievable by the present cable assemblies which utilize a guide means having a wear-surface comprised of the present polymer composites. In certain of the examples which follow, the performance of a liner for a pull-pull type cable assembly was evaluated using what is referred to herein as a "S-test." This test is conducted using an "S" shaped fixture wherein the curvilinear portions of the inner radii of the "S" fixture extend about 120°. A 7×7 stranded and swedged stainless steel core member having a diameter of about 62 mils is drawn through the tubular liner in a reciprocating manner at a rate of about 60 cycles per minute. The liner has an inner diameter of about 98 mils and an outer diameter of about 120 mils. Thus, a gap of about 18 mils exists between the core and the liner. A silicone-based oil is provided as a lubricant in the core in certain of the examples, as is common. Each S-test cycle consists of a forward travel of about one and one-half inches and a like return. Frictional efficiency and abrasion resistance are determined by applying an operating load to one end of the core member of the cable assembly as it travels along the S-shaped path. The operating load is applied by either a spring or a weight. Frictional efficiency measurements are taken at various intervals of cycles by employing a load cell (transducer) and recording the actual load necessary to move the cable over the surface of the liner at four cycles per minute. For the actual measurement, the operating load is replaced by a five pound dead weight. The frictional efficiency is calculated as a percentage by dividing the measured force into the five pound dead weight. When the spring is the operating load, it exerts about 6 pounds of force in the fully retracted position of the S-test cycle and about 18 pounds of force in the fully expanded position of the S-test cycle. For the purposes of convenience, the term "low load frictional efficiency" refers to a frictional efficiency determined using a spring of the type described above. In an alternative test, the spring is replaced by a 25 pound dead weight. As the term is used herein, "high load frictional efficiency" refers to a frictional efficiency determined using the 25 pound weight. The S-test apparatus is adapted to be operated under both ambient conditions and at conditions of elevated temperature. For the purposes of convenience, an S-test according to the procedures described above which is conducted under ambient conditions is referred to herein as an ambient S-test. When an S-test according to the procedures described above is conducted at elevated temperature conditions, the temperature is reflected in the description of the S-test. Thus, when the test is conducted at temperature of 200° F. with the 6–18 spring, the test is referred to herein as a low load 200° F. S-test. In the test results, the letter "F" following a given calculated efficiency at a given number of cycles indicates a failure of the liner, i.e., a wearing through of the liner by the cable. Such a failure is determined by the cable contacting a base metal after wear through and closing the electrical circuit which stops the tester.

According to preferred embodiments, the present liners exhibit exceptional abrasion resistance and frictional efficiency, especially under high temperature conditions. While it is contemplated that all such levels of abrasion resistance and frictional efficiency are within the scope of the present invention, it is generally preferred that the cable assemblies of the present invention include a liner which is capable of withstanding, that is, has an abrasion tolerance of at least about 750,000 cycles of the ambient high-load S-test. It is also preferred that the cable assemblies comprise a liner having a frictional efficiency of at least about 90% after 750,000 cycles of the ambient high-load S-test, and even more preferably after 1,000,000 cycles of the ambient high-load S-test. According to certain embodiments, it is preferred that the cable assemblies include a liner having a frictional efficiency of greater than about 85% after 2,000,000 cycles of the ambient high-load S-test, and even more preferably, after 2,500,000 cycles of the ambient high-load S-test.

Comparative Example 1A

A high load ambient S-test was conducted to establish the frictional efficiency, under high loads and at room temperature, of a cable assembly having a PTFE conduit filled with about 10% by weight of polyarylene sulfide as disclosed in U.S. Pat. No. 4,362,069. The polymer composite was extruded into a tubular product having an inside diameter of 0.097 inches and an outside diameter of about 0.123 inches. The tubular product thus formed had a wall thickness of about 0.01 inches and was subjected to the high load, ambient S-test, as described above.

The initial frictional efficiency of the assembly using the PPS filled liner (liner A in Table I) was found to be 87.0%. The frictional efficiency was found to decline, as indicated in Table I, until the frictional efficiency at 500,000 cycles of the high load ambient S-test was found to be 86.5%. The liner failed at 560,000 cycles.

Comparative Example 1B

A high load ambient S-test was conducted to establish the failure which occurs in cable assemblies employing fluoropolymer liner having as much as 10% weight of polyimide resin under high load conditions. A liner consisting of PTFE and about 10% by weight of aromatic thermoplastic polyimide was formed by paste extrusion to produce a tubular product having an inside diameter of 0.109 inches and an outside diameter of 0.131 inches. The tubular product was subject to an ambient high-load S-test. The frictional efficiency of the product (liner B in Table I) was initially 85.0%. The liner experienced catastrophic failure at 612,000 cycles of the S-test due to wear-through.

EXAMPLE 1

A high load ambient S-test was performed to show the improved frictional efficiency of cable assemblies having liners according to the present invention. A liner was formed as in Comparative Example 1B, except only 3% by weight of the polyimide resin was used. The composite according to the present invention was cold-flow extruded to produce a tubular product having an inside diameter of 0.099 inches and an outside diameter of 0.121 inches. The tubular product (liner C in Table II) was subject to the high load, ambient S-test, as described in Comparative Example 1A. The initial frictional efficiency was found to be 92.5%, an increase over the initial frictional efficiency of the liner tested in Comparative Examples 1A and 1B. Surprisingly, and more importantly, the frictional efficiency actually increased to 92.5% during a significant portion of the test, as revealed in Table II, and after 750,000 cycles of operation was greater than 90%. Furthermore, a frictional efficiency of greater than 90% was maintained to approximately 1,500,000 cycles. With only a moderate drop off in frictional efficiency, the cable assembly continued to perform well even up to about 2,792,000 cycles of operation.

It will be appreciated by those skilled in the art that the preferred embodiments disclosed herein are illustrative of the present invention but not limiting thereof. Accordingly, modifications of the disclosed embodiments are possible without departing from the proper scope of the present invention, which is defined by the claims which follow.

Comparative Example 2

A low load ambient S-test was also conducted to establish the frictional efficiency, under low loads and at room temperature, of a cable assembly comprising natural PTFE, and cable assembly having a PTFE conduit filled with about 10% by weight of polyarylene sulfide as disclosed in U.S. Pat. No. 4,362,069. The tubular liner comprising a PTFE and polyarylene sulfide composite tested is sold under the designation AR-500. AR-500 is a PTFE composite manufactured by the assignee of the present invention and consists essentially of about 10% by weight of a resin of polyphenylene sulfide and about 90% by weight of PTFE resin.

In Comparative Example 2, a low load ambient S-test was conducted to compare the failures which occur in unlubricated PTFE and AR-500 cable assemblies. A liner consisting of PTFE was formed by paste extrusion to produce a tubular product having an inside diameter of 0.082 inches and an outside diameter of 0.117 inches. The tubular product was subject to an ambient high-load S-test. The frictional efficiency of the product (liner D in Table III) was initially 71.0%. The liner experienced catastrophic failure at 40,183 cycles of the S-test due to wear-through.

An AR-500 liner was also formed by paste extrusion to produce a tubular product having an inside diameter of 0.099 inches and an outside diameter of 0.115 inches. The tubular product was subject to an ambient low load S-test. The frictional efficiency of the product (liner E in Table III) was initially 74.5%. The liner experienced catastrophic failure at 89,176 cycles of the S-test due to wear-through.

EXAMPLE 2

A low load ambient S-test was performed to show the improved frictional efficiency of cable assemblies having liners according to the present invention. Three liners according to the present invention were formed by paste extrusion consisting of PTFE and 3%, 6%, and 10% by weight of aromatic thermoplastic polyimide, respectively (liners F, G and H in Table III, respectively). The tubular products so formed had inside diameters of 0.099, 0.098 and 0.098 inches, respectively, and outside diameters of 0.121 inches. These liners exhibited initial frictional efficiency of 73.5%, 74.0% and 73.5%, respectively. In marked contrast to liners D and E of Comarative Example 2, which employed no polyimide resin, liners F, G and H made in accordance with the present invention demonstrated superior wear. None of these three liners experienced catastrophic failure during the S-test and they each maintained a 64.5% frictional efficiency even after 525,000 cycles of the S-test.

Comparative Example 3

A high load ambient tortuous S-test was then conducted to compare the failures which occur in prior art PTFE and AR-500 cable assemblies under high load conditions. The tortuous S-test is in all respects similar to the S-tests of Comparative Examples 1 and 2 except that in the tortuous S-test the tubular products tested are subjected to loads under a greater degree of distortion. This test is conducted using an "S" shaped fixture wherein the curvilinear portions of the inner radii of the "S" fixture extend about 180°.

Figure 3:
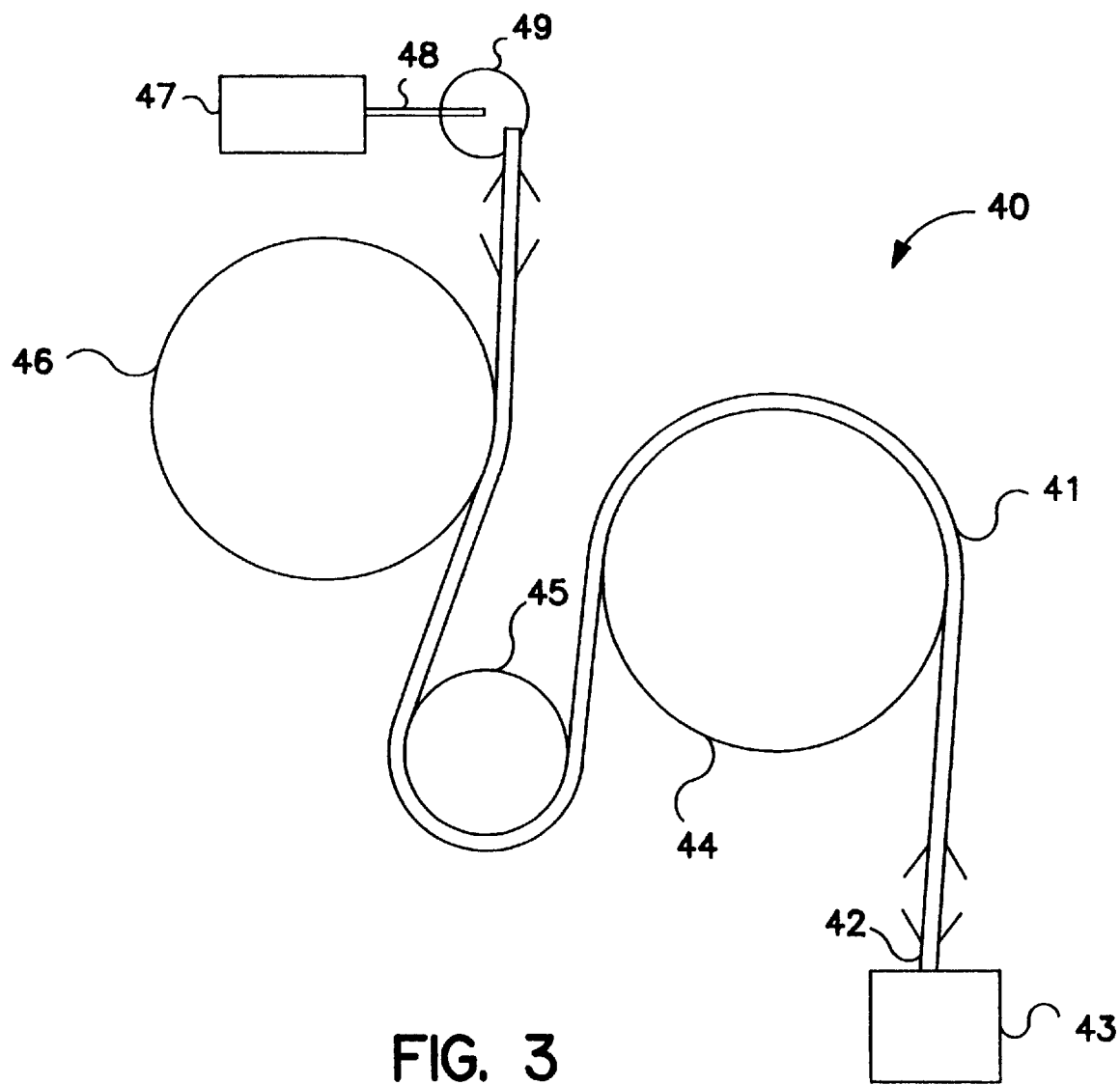
FIG. 3 is a semi-schematic representation of a cable assembly undergoing a tortuous S-test in which the cable assembly is subjected to high load conditions.

Referring to FIG. 3, the tortuous S-test, shown generally at 40 involves threading cable assembly 41 around wheel 44, 45 and 46 as shown so that the curvilinear portions of the inner radii of the "S" fixture extend about 180°. For a high load tortuous S-test, as performed, a twenty-five pound dead weight 43 is attached to core 42 of cable assembly 41, and the other end of core 42 of cable assembly 41 is attached to rotating cam 49 which is supported by arm 48 and powered by motor 47. The test is thus performed by the operation of motor 47 which rotates cam 49 thereby causing an reciprocating motion of core 42 with respect to cable assembly 41 under the high load conditions due to twenty-five pound dead weight 43.

A liner consisting of PTFE was formed by paste extrusion to produce a tubular product having an inside diameter of 0.097 inches and an outside diameter of 0.119 inches. The tubular product was subject to an ambient high load tortuous S-test. The frictional efficiency of the product (liner I in Table IV) was initially 82.0%. The liner experienced catastrophic failure at 39,700 cycles of the tortuous S-test due to wear-through.

An AR-500 liner was also formed by paste extrusion to produce a tubular product having an inside diameter of 0.099 inches and an outside diameter of 0.121 inches. The tubular product was subject to an ambient high load tortuous S-test. The frictional efficiency of the product (liner J in Table IV) was initially 80.0%. The liner experienced catastrophic failure at 65,900 cycles of the tortuous S-test due to wear-through.

EXAMPLE 3

A high load ambient tortuous S-test was then conducted to show the improved frictional efficiency of cable assemblies having liners according to the present invention. Two liners according to the present invention were formed by paste extrusion consisting of PTFE and aromatic thermoplastic polyimide. The first of these two liners comprised 3% by weight of the polyimide (liner K in Table IV), and the second of these two liners comprised 6% by weight of the polyimide (liner L in Table IV). The tubular products so formed had inside diameters of 0.098 inches, and outside diameters of 0.121 inches. These liners exhibited initial frictional efficiency of 81.0% and 85.0%, respectively. While liner K, which employed 3% by weight polyimide resin, experienced catastrophic failure at 69,300 cycles of the tortuous S-test due to wear-through, liner L made in accordance with the present invention demonstrated dramatically superior wear. Liner L maintained a frictional efficiency of 82.5% after 423,983 cycles, and experienced catastrophic failure after 456,846 cycles during the tortuous S-test due to wear-through.

TABLE I

LIFE CYCLE S-TEST DATA - COMPARATIVE EXAMPLES IA AND IB

| Liner | Test Temp °F. | Loading | Initial Efficiency | 85 | 176 | 262 | 353 | 470 | |
|---|---|---|---|---|---|---|---|---|---|
| A | RT | High | 87.0 | 90.5 | 89.0 | 88.0 | 88.0 | 86.5 | F* |
| B | RT | High | 85.0 | 87.5 | 87.0 | 87.5 | 87.0 | 86.5 | F** |

*Failure at 560,000
**Failure at 612,000

TABLE II

LIFE CYCLE S-TEST DATA - PRESENT INVENTION

| Liner | Test Temp °F. | Loading | Initial Efficiency | 230 | 532 | 907 | 1293 | 2792 |
|---|---|---|---|---|---|---|---|---|
| C | RT | High | 92.5 | 93.5 | 93.0 | 92.0 | 90.5 | 87.5 |

TABLE III

LIFE CYCLE S-TEST DATA - COMPARATIVE EXAMPLE II AND EXAMPLE II

| Liner | Test Temp °F. | Loading | Initial Efficiency | 110 | 200 | 338 | 404 | 525 |
|---|---|---|---|---|---|---|---|---|
| D | RT | Low | 71.0 | F* | | | | |
| E | RT | Low | 74.5 | F** | | | | |
| F | RT | Low | 73.5 | 67.0 | 65.0 | 64.0 | 64.0 | 64.5 |
| G | RT | Low | 74.0 | 66.5 | 65.5 | 65.0 | 65.0 | 64.5 |
| H | RT | Low | 73.0 | 66.5 | 66.5 | 66.5 | 65.5 | 64.5 |

*Failure at 40,183
**Failure at 89,186

TABLE IV

LIFE CYCLE TORTUOUS S-TEST DATA COMPARATIVE EXAMPLE III AND EXAMPLE III

| Liner | Test Temp °F. | Loading | Initial Efficiency | 96.5 | 181† | 250 | 330 | 424‡ |
|---|---|---|---|---|---|---|---|---|
| I | RT | High | 82.0 | F* | | | | |
| J | RT | High | 80.0 | F** | | | | |
| K | RT | High | 81.0 | F*** | | | | |
| L | RT | High | 85.0 | 66.5 | 65.5 | 65.0 | 65.0 | 64.5 |

*Failure at 39,700
**Failure at 65,900
***Failure at 69,300
†Actual cycles = 180,534
‡Actual cycles = 423,983

What is claimed is:

1. A motion transmitting cable assembly comprising:

an elongated core for transmitting a force along a predetermined path; and an abrasion resistant paste extruded tubular product for guiding the core and having a low friction inner surface against which said core bears as it transmits the force along said predetermined path, said low friction surface comprising a major proportion of fluorocarbon polymer resin and less than about 10% by weight polyimide resin.

* * * * *